United States Patent Office

2,796,410
CHROMIA-ALUMINA BASE REFORMING CATALYST HAVING A LOW RATE OF CRYSTALLIZATION

Harold A. Strecker, Bedford, and Harrison M. Stine, Lyndhurst, Ohio, assignors to The Standard Oil Company, Cleveland, Ohio, a corporation of Ohio No Drawing. Application December 21, 1953, Serial No. 399,623

1 Claim. (Cl. 252—465)

The present invention relates to a catalyst useful for hydrocarbon reforming reactions. More particularly, the invention relates to a catalyst consisting essentially of a base component selected from the group consisting of coprecipitated chromia-alumina catalysts and platinum oxide promoted derivatives thereof, and a promoting component selected from the group consistng of uranium, indium, cadmium, barium, thorium, tantalum, and rubidium oxides.

Catalysts consisting essentially of coprecipitated mixtures of alumina and chromia, i. e., aluminum oxide ($Al_2O_3$) and chromium oxide ($Cr_2O_3$), have been widely used in various types of hydrocarbon conversions or reforming reactions. In general, all of such reactions involve the treatment of a relatively light petroleum fraction, such as naphtha or gasoline, containing an appreciable amount of paraffins and naphthenes at an elevated temperature in the presence of the catalyst to alter the characteristics of the hydrocarbon. The reforming reactions embrace dehydrogenation, dehydrocyclization, and aromatization of the hydrocarbons to produce fractions of approximately the same general boiling range, but of different chemical structure and performance characteristics. A reformed product has a substantially increased octane number due, in part, to the increased aromatic content.

In addition to catalysts which consist essentially of chromia and alumina, catalysts in which the base is composed of chromia and alumina but in which a minor amount of platinum oxide (or its equivalent, palladium oxide) has been incorporated have been proposed in our copending application, Serial No. 313,786, filed October 8, 1952, for use in hydrocarbon reforming reactions. It is there disclosed that the incorporation of a small proportion of these oxides in a coprecipitated chromia-alumina base catalyst is capable of improving the chromia-alumina base to the extent that the deposition of coke at a given conversion level is minimized as compared with the coke deposition obtained using a chromia-alumina catalyst which does not have the platinum oxide incorporated therein.

The general practice in reforming reactions is to process a given hydrocarbon charge in the presence of one of these catalysts for a period of time corresponding to the useful period of catalytic activity and to then regenerate the catalyst by oxidation with an oxygen-containing gas such as air.

The hereinabove described catalysts which consist essentially either of coprecipitated mixtures of chromia and alumina or coprecipitated mixtures of chromia and alumina promoted with platinum oxide have proved to be of outstanding value with respect to their activity and selectivity in promoting the desired reactions in a hydrocarbon reforming process. These catalysts, however, in varying degree gradually lose their catalytic effectiveness during the treatment of hydrocarbons because they undergo a gradual transformation to an inactive form whereupon regeneration is no longer effective.

This tendency of the prior art catalysts to become inactive is disadvantageous. Not only does it necessitate relatively frequent replacement of the catalysts during use but also it limits the temperatures which can be safely employed during regeneration, since high temperatures accelerate the transformation to an inactive form.

At the present stage of the development of coprecipitated chromia-alumina catalysts, it has been shown that the loss of the catalytic activity of the catalyst is accompanied by an increase in the crystalline structure of the catalyst. It has been further demonstrated that this increase in the crystallinity of the catalyst is directly related to the loss of catalytic activity. A phenomenon accompanying the increase in crystallization is loss of surface area which has been observed during the thermal reactions utilizing such catalysts. Accordingly, it has been determined that the relative life span of a given catalyst can be determined by heating the catalyst at a given temperature, cooling the catalyst and then examining the catalyst by means of an X-ray spectrometer. The greater the crystallinity, the shorter will be the useful life of the catalyst. By comparing the crystallinity of one catalyst with another, the relative life to be expected of each catalyst is thereby ascertained.

In accordance with the present invention, it has been found that the incorporation of a small amount of a promoting component selected from the group consisting of uranium, indium, cadmium, thorium, tantalum, rubidium and barium oxides into a base component of the type above described results in a catalyst having a decreased rate of crystallization and, hence, longer catalytic life.

The preparation of the base component for the catalyst of the present invention has previously been described. For example, prior Patent No. 2,236,514, assigned to our assignee, describes a gel-type catalyst of chromia and alumina which is formed by coprecipitating precursors of these two ingredients. In an illustrative embodiment described in that patent, a mixture of aluminum and chromium nitrates is treated with ammonia.

Other methods for preparing chromia-alumina catalysts are also known to the art. For example, such a catalyst may be prepared by mixing solutions of chromium acetate and sodium aluminate accompanied by the addition of sulfuric acid to maintain a pH of about 8.5. The resulting precipitate is then washed free of sulfate and dried at about 100° F. to a volatile content of about 3%.

In all of such preparations, the proportion of chromia and alumina in the coprecipitated mass is controlled by the respective amounts of chromium and aluminum salts employed. In the present invention, the base component of the catalysts should contain from about 18 to 30 mol percent chromia to about 82 to 70 mol percent alumina, preferably from about 20 to 24 mol percent chromia to about 80 to 76 mol percent alumina.

The preparation of chromia-alumina-platinum oxide catalysts has been described in our aforesaid copending application, Serial No. 313,786, and any of the catalysts of this type that are described therein can also be used as base components in the catalyst of the present invention. While the platinum oxide may be coprecipitated with the chromia and alumina, we have found the base component entirely suitable when the chromia and alumina are coprecipitated and the platinum oxide incorporated by impregnation. The chromia-alumina base may be the same as that described heretofore and may be made by the same methods.

To produce a chromia-alumina-platinum oxide base component for the present invention, a chromia-alumina base may be impregnated with a solution of a salt of platinum which can be converted to the oxide upon heating. The concentration of the solution and the length of the impregnating time are such as to incorporate the desired amount of platinum oxide, which may be from about 0.001 to about 1.0 mol percent of the base component. This generally requires a solution having a concentration from about 0.0001 to about 0.10 mol per liter. The base component may be treated with the impregnating solution for from a few minutes to several days, depending on the concentration of the solution and the amount of salt to be absorbed, the excess solution drained away, and the base component dried. The base component is then heated at a high temperature, usually from about 850 to 1250° F., for a period of from four to twenty-four hours in an atmosphere of a gas such as dry nitrogen and cooled in a similar atmosphere. During this heating, the impregnating salt is converted to the oxide.

In the preparation of the catalyst of the invention, the incorporation of the promoting component into the base component is not a critical procedure and may be accomplished by conventional techniques. While the promoting component, i. e., an oxide selected from the group consisting of uranium, indium, cadmium, barium, thorium, tantalum, and rubidium oxides, may be introduced into the base component by coprecipitation, we have found the resulting catalyst entirely satisfactory when the promoting component is incorporated by impregnation. The promoting component, accordingly, may be incorporated in the catalyst by the same general method outlined hereinabove for the introduction of platinum oxide by impregnation. For example, a coprecipitated chromia-alumina base component may be slurried in an aqueous solution of a water-soluble salt of uranium, indium, cadmium, barium, thorium, tantalum or rubidium and the salt may then be converted to the oxide by heating. When preparing a catalyst in which the base component is a chromia-alumina-platinum oxide catalyst, the promoting component and the platinum oxide may be introduced by impregnation simultaneously or separately. Regardless of the method by which the promoting component is incorporated in the catalyst, the catalyst of the invention should contain from about 0.1 to about 3.0 mol percent of the promoting component, preferably from about 0.3 to about 2.0 mol percent thereof.

The catalyst of the present invention may be in any of the usual physical forms, more particularly, in particles of any size or shape. If the catalyst is finely divided, the reforming operation may be carried out with a catalyst in a "fluidized" condition using the so-called fluid-reforming technique. The catalyst may also be in larger particles, such as beads, which are commonly used in the fixed and moving bed techniques.

When used in a reforming reaction, the present catalyst is possessed of a relatively longer life than other known catalysts before its activity diminishes to any appreciable extent. It is also characteristic of the present catalyst that it may be repeatedly reactivated without material loss of catalytic efficiency and that higher temperatures may be employed in the reactivation without danger of causing increased crystallization in the catalyst.

The following illustrative examples and data are given to illustrate the preparation of the catalyst of this invention and to demonstrate the improved characteristics of the catalyst.

*Example 1*

A chromia-alumina catalyst was prepared, as hereinbefore described, by the coprecipitation of chromia and alumina to provide a base component in bead form having the following composition:

| | |
|---|---:|
| Wt. percent volatile at 1000° F | 3.0 |
| Wt. percent $Cr_2O_3$ | 31.0 |
| Wt. percent $Al_2O_3$ | 66.0 |
| Mol percent $Cr_2O_3$ | 24.0 |
| Mol percent $Al_2O_3$ | 76.0 |

0.2098 gram of cadmium nitrate was dissolved in 10 milliliters of distilled water and 10 grams of the chromia-alumina base component was soaked in the solution for thirty minutes. The catalyst was drained and dried in an oven at 250° F. for two hours. About one-half of the cadmium nitrate was lost in the draining of the excess solution. The resultant catalyst was in bead form and contained about 0.4 mol percent of cadmium.

*Examples 2 through 16*

A series of different catalysts were prepared according to the procedure of Example 1 by impregnating 10 grams of the chromia-alumina base component with a solution of a salt of one of the metals uranium, cadmium, indium, thorium, rubidium, tantalum and barium. The following table describes the amount and identity of the impregnating compound and shows the mol percentage of metal in the final catalyst:

TABLE I

| Example No. | Wt. in Grams of Impregnant | Conc. Mol Percent of Metal in Catalyst |
|---|---|---|
| 2 | 0.360 g. $UO_2(C_2H_3O_2)_2.2H_2O$ | 0.5 |
| 3 | 0.7212 g. $UO_2(C_2H_3O_2)_2.2H_2O$ | 1.0 |
| 4 | 1.4424 g. $UO_2(C_2H_3O_2)_2.2H_2O$ | 2.0 |
| 5 | 1.045 g. $Cd(NO_3)_2.4H_2O$ | 2.0 |
| 6 | 0.0482 g. $In_2O_3$ (dissolved in hot conc. HCl) | 0.2 |
| 7 | 0.0963 g. $In_2O_3$ (dissolved in hot conc. HCl) | 0.4 |
| 8 | 0.4818 g. $In_2O_3$ (dissolved in hot conc. HCl) | 2.0 |
| 9 | 0.0786 g. $Rb_2CO_3$ | 0.4 |
| 10 | 0.1963 g. $Rb_2CO_3$ | 1.0 |
| 11 | 0.4649 g. $Ba(C_2H_3O_2)_2.H_2O$ | 1.0 |
| 12 | 0.9298 g. $Ba(C_2H_3O_2)_2.H_2O$ | 2.0 |
| 13 | 0.4694 g. $Th(NO_3)_4.4H_2O$ | 0.5 |
| 14 | 1.8776 g. $Th(NO_3)_4.4H_2O$ | 2.0 |
| 15 | 0.2436 g. $TaCl_5$ (in absolute alcohol) | 0.4 |
| 16 | 0.3655 g. $TaCl_5$ (in absolute alcohol) (added to base component already containing 1.4 mol percent Ta). | 2.0 |

*Example 17*

A chromia-alumina-platinum oxide base component was prepared as follows: 0.1994 gram of a 10% solution of platinum chloride in water was diluted to 50 ml. with additional quantities of water and the solution was poured over 50 grams of the chromia-alumina base component used in the preparations of the preceding examples. The mixture was allowed to stand at room temperature for 1 hour with frequent stirring. The beads and solution were then placed in an oven at 250° F. for 48 hours with frequent stirring during the first hour. The base component was then heat treated at 900° C. in air for 2 hours. The resulting base component contained alumina and chromia in the proportion of 76 mol percent of the former to 24 mol percent of the latter and contained, based on the total weight of the catalyst, 0.015% of (about 0.030 mol percent) platinum.

The chromia-alumina-platinum oxide base component prepared as above was promoted with 1 mol percent of barium oxide by slurrying 10 grams of the base in an aqueous solution containing 0.4649 gram of barium acetate monohydrate dissolved in 10 ml. of distilled water. The base was allowed to soak in the barium acetate solution for 30 minutes, the catalyst was then drained and dried in an oven at 250° F. for 2 hours.

*Examples 18 through 20*

A further series of catalysts was prepared from the chromia-alumina-platinum oxide base component made according to the procedure of Example 17 by impregnating the base component with a solution of a salt of barium or uranium. The following table describes the amount and identity of the impregnant and shows the mol percentage of metal in the final catalyst:

TABLE II

| Example No. | Wt. in Grams of Impregnant | Mol percent of Metal in Catalyst |
|---|---|---|
| 18 | 0.9298 g. Ba($C_2H_3O_2$)$_2$·$H_2O$ | 2.0 |
| 19 | 0.7212 g. $UO_2$($C_2H_3O_2$)$_2$·$H_2O$ | 1.0 |
| 20 | 1.4424 g. $UO_2$($C_2H_3O_2$)$_2$·$H_2O$ | 2.0 |

*Example 20A*

Samples of all the catalysts prepared in the preceding examples were heated at a temperature of 1500° F. for 1 hour in air and were thereafter ground in a mortar and examined by means of an X-ray spectrometer. The conditions for this thermal treatment were selected to give about 75% of the total amount of crystallization which could be developed by prolonged heating at 1600° F.

The following table gives the data on the relative rates of crystallization as observed by the X-ray spectrometer, the degree of crystallization of the base components being equated to 1:

TABLE III

| Base Catalyst | Addn. Comp. Oxide | Conc., Mol percent | Relative Crystallization [1] |
|---|---|---|---|
| Cr—Al | None | ----- | 1.00 |
| Cr—Al | U | 0.5 | 0.85 |
| Cr—Al | U | 1.0 | 0.75 |
| Cr—Al | U | 2.0 | 0.62 |
| Cr—Al | Cd | 0.4 | 0.91 |
| Cr—Al | Cd | 2.0 | 0.67 |
| Cr—Al | In | 0.2 | 0.90 |
| Cr—Al | In | 0.4 | 0.66 |
| Cr—Al | In | 2.0 | 0.63 |
| Cr—Al | Rb | 0.4 | 0.78 |
| Cr—Al | Rb | 1.0 | 0.93 |
| Cr—Al | Ba | 1.0 | 0.76 |
| Cr—Al | Ba | 2.0 | 0.79 |
| Cr—Al | Th | 0.5 | 0.61 |
| Cr—Al | Th | 2.0 | 0.80 |
| Cr—Al | Ta | 0.4 | 0.59 |
| Cr—Al | Ta | 2.0 | 0.58 |
| Cr—Al—Pt | None | ----- | 1.00 |
| Cr—Al—Pt | U | 1.0 | 0.45 |
| Cr—Al—Pt | U | 2.0 | 0.50 |
| Cr—Al—Pt | Ba | 1.0 | 0.64 |
| Cr—Al—Pt | Ba | 2.0 | 0.45 |

[1] Ratio of crystallinity of final catalyst to base components. Average of ratios of intensities of two diffraction lines in $Cr_2O_3$ X-ray diffraction pattern.

It can be seen from the preceding table that all of the promoting components disclosed and claimed in the present invention impart improvement to the base component and that the catalysts of the invention possess a much longer active life than the base component alone.

The word "chromia" is used herein synonomously with chromium oxide.

It is intended to cover all changes and modifications in the examples of the invention, herein given for purposes of disclosure, which do not constitute departure from the spirit and scope of the appended claim.

We claim:

A catalyst useful for hydrocarbon reforming reactions consisting essentially of a coprecipitated chromia-alumina base catalyst selected from the group consisting of chromia-alumina catalysts in which said chromia and alumina are in proportions to each other of from about 18 to about 30 mol percent of chromia to about 82 to about 70 mol percent of alumina, and chromia-alumina-platinum oxide catalysts in which said chromia and alumina are in proportions to each other of from about 18 to about 30 mol percent of chromia to about 82 to about 70 mol percent of alumina, and the chromia-alumina-platinum oxide catalyst also contains from about 0.001 to about 1 mol percent of platinum oxide by weight of the catalyst; and a promoting component selected from the group consisting of uranium, indium, cadmium, barium, thorium, tantalum and rubidium oxides, the promoting component comprising from about 0.1 to about 3 mol percent of the base catalyst.

References Cited in the file of this patent

UNITED STATES PATENTS

| | | |
|---|---|---|
| 2,236,514 | Burk et al. | Apr. 1, 1941 |
| 2,436,555 | Edson et al. | Feb. 24, 1948 |
| 2,499,675 | Owen | Mar. 7, 1950 |
| 2,635,082 | Smith | Apr. 14, 1953 |
| 2,638,455 | Pitzer | May 12, 1953 |
| 2,658,028 | Haensel et al. | Nov. 3, 1953 |
| 2,668,142 | Strecker et al. | Feb. 2, 1954 |